United States Patent
Arbuckle

(10) Patent No.: US 8,849,006 B2
(45) Date of Patent: Sep. 30, 2014

(54) DARKFIELD IMAGING SYSTEM AND METHODS FOR AUTOMATED SCREENING OF CELLS

(75) Inventor: John D. Arbuckle, Guelph (CA)

(73) Assignee: Quorum Technologies Inc., Guelph, Ontario (CA)

( * ) Notice: Subject to any disclaimer, the term of this patent is extended or adjusted under 35 U.S.C. 154(b) by 619 days.

(21) Appl. No.: 12/731,344

(22) Filed: Mar. 25, 2010

(65) Prior Publication Data

US 2010/0246927 A1 Sep. 30, 2010

Related U.S. Application Data

(60) Provisional application No. 61/163,181, filed on Mar. 25, 2009.

(51) Int. Cl.
| | |
|---|---|
| *G02B 21/10* | (2006.01) |
| *G06K 9/62* | (2006.01) |
| *G06K 9/00* | (2006.01) |
| *G02B 21/36* | (2006.01) |

(52) U.S. Cl.
CPC ............ *G02B 21/10* (2013.01); *G06K 9/00127* (2013.01); *G02B 21/361* (2013.01)
USPC .................................... 382/133; 705/2; 705/3

(58) Field of Classification Search
CPC ... G02B 21/10; G02B 21/361; G06K 9/00127
USPC ......................................................... 382/133
See application file for complete search history.

(56) References Cited

U.S. PATENT DOCUMENTS

| | | | |
|---|---|---|---|
| 6,704,140 B1 | 3/2004 | Richardson | |
| 7,095,904 B2 | 8/2006 | Wang | |
| 2006/0068371 A1* | 3/2006 | Ortyn et al. | 435/4 |
| 2007/0041627 A1* | 2/2007 | Douglass | 382/133 |
| 2009/0213369 A1* | 8/2009 | Lee et al. | 356/301 |

* cited by examiner

*Primary Examiner* — Hiep V Nguyen
(74) *Attorney, Agent, or Firm* — Perry + Currier, Inc.

(57) ABSTRACT

The disclosure is directed at a system and method for darkfield imaging system and method for automated cell screening of cells. The system and method acquires multi- or hyperspectral digital darkfield images of cells and then processes the images to obtain measurements which can then be supplied or displayed to a user to analyze.

17 Claims, 6 Drawing Sheets

DARKFIELD IMAGING SYSTEM AND METHODS FOR AUTOMATED SCREENING OF CELLS

CROSS-REFERENCE TO RELATED APPLICATIONS

This application claims the benefit of U.S. Provisional Patent Application No. 61/163,181 filed Mar. 25, 2009, which is incorporated herein by reference.

FIELD OF THE DISCLOSURE

This application generally relates to the area of optical microscopy and image analysis, and specifically to a darkfield imaging system and method for automated cell screening of cells.

BACKGROUND

Image based cell screening is used in a variety of applications including pharmaceutical drug discovery, genomics and basic research and is known by several names such as high content screening, phenotypic screening or chemical genetics. The key requirements in cell screening are that the entire screening process of image acquisition, image analysis and data management needs to be fully automated, which requires robust imaging and image analysis techniques, and that the process is as non-invasive as possible to ensure that any biological changes observed in cells are not due to any adverse effects on cells, in whole or in part, by the screening process being used. Many previous image based cell screening methods have been invasive to varying extents.

Cell screening to date has generally been done using fluorescence microscopy where specific molecules or proteins of interest in cells are tagged with fluorescent probes or proteins and the temporal or spatial location of fluorescently labelled reporter molecules imaged and analyzed. However, fluorescence based imaging methods are invasive and may give incomplete information about cells.

There are inherent limitations to using fluorescent reporters and fluorescence illumination in cell screening with respect to maintaining the integrity of the cell and the reporter, particularly when living cells are imaged. Fluorescent methods may be toxic to cells where the toxicity may result from the fluorescent tag itself being toxic to cells; from damage to the cell caused by absorption of the excitation light by the fluorescent tag; or by damage to the cell caused by absorption of excitation light by natural components of the cells. Toxicity damage may also result from the generation of oxygen radicals or other like substances. The consequence is that the long-term survival of cells may be compromised by the necessity of using fluorescent approaches.

An additional limitation of fluorescence imaging results from photobleaching. Photobleaching is used to refer to the fluorescent excitation and resultant photochemical destruction of a fluorescent molecule when under fluorescent illumination. When photobleaching of a fluorescent reporter molecule in cell screening occurs, this may complicate the observation of the fluorescent molecules, since they will eventually be destroyed by the light exposure necessary to stimulate them into fluorescing. This may be especially problematic in time-lapsed microscopy.

Previous cell screening methods also generally employ dyes that bind to deoxyribonucleic acid (DNA). The DNA dye is excited by a different wavelength of light from that used to excite the fluorescent reporter molecules of interest. Commonly used dyes such as DAPI and Hoechst are excited at ultraviolet (UV) wavelengths that damage DNA and are injurious to cells. The main purpose of the DNA dye is to help in identifying the location of the nucleus, nuclear membrane or chromosomes. The location of the nucleus, an important landmark within the cell, is then used by image processing algorithms to provide positional information about other compartments of the cell and the location of fluorescent reporter molecules in the cell. The limitation of this technique is that these DNA-binding dyes, and the UV light used to excite them, are highly toxic to living cells and therefore highly invasive.

It is, therefore, desirable to provide a novel darkfield imaging system and method for automated screening of cells.

SUMMARY

In one aspect, there is provided a label-free (reporter-free) non-invasive imaging system and method that images and analyses cells and subcellular objects by multi-spectral darkfield microscopy. Darkfield microscopy utilizes oblique illumination to enhance contrast and increase the visibility of cells and of structures within cells. Only light that is scattered by components of the cell enter the objective lens and form an image on the charge coupled device (CCD). Objects are seen as bright objects against a black background. The system includes a darkfield microscope which can operate as an inverted darkfield contrast microscope, a motorized stage, an autofocus device and a color CCD camera under the control of a processor, such as a computer processing unit (CPU). Inverted darkfield contrast microscopy refers to the inversion of darkfield images to obtain a negative image in which objects are seen as dark objects against a bright background whereby the resulting image resembles a brightfield image in appearance but has greatly improved contrast and signal to noise ratio of cells and of internal cellular structures. Autofocus refers to the use of an objective motor drive, or a piezoelectrically driven z-axis microscope stage, and autofocus apparatus or software to determine the preferred focal plane or planes in the sample for acquiring images. One advantage of the autofocus in the present disclosure is that the focal plane for imaging is determined using automated color image processing and also that the color image processing is done on darkfield or inverted darkfield images. The cell screening system and method provides multi-parametric information about cell structure including overall cell shape, interactions between cells and the structure and distribution of intracellular objects. Spatial and temporal information about objects and cells provides information about general physiological responses of cells to test stimuli such as chemical entities. The output of the system is a classification of cells, subcellular objects and cell responses based on feature vector and statistical analyses. The system and method provides non-invasive automated cell screening of living or chemically fixed cells. In another embodiment, the present dislcosure is able to detect color information in darkfield images and to use it in the segmentation and classification of objects and cell physiological states.

In another aspect, there is provided a darkfield cell screening system that employs an imaging spectrometer rather than, or in combination with, a CCD camera to identify and classify cells and objects in or on cells in a non-invasive manner. Imaging spectrometry is also referred to as hyperspectral imaging. Different cells or different objects in or on cells can present spectral information that is recognized as spectral fingerprints or spectral signatures. A topological map of identified spectral objects within the cell is created pixel by pixel.

Image analysis algorithms determine the spectral signatures or spectral footprints of cells and objects using spectra acquired on a pixel by pixel basis during darkfield imaging. CCD cameras generally cover the visible through near infrared spectral range (400-1000 nm) and imaging of biological cells is generally restricted to the visible range (400-700 nm). The present disclosure may obtain spectral information at these and higher wavelengths that are not identified by previous CCD based methods. Imaging spectrometers extend the spectral range (400-2500 nm). The variable quantum efficiency of CCD cameras at different wavelengths, another limitation of CCD cameras, can also be corrected in imaging spectrometry. In the present disclosure, image spectrometry (hyperspectral imaging) can reveal previously undetected spectral information that provides a new means to segment and classify objects, and the physiological states of cells.

In another aspect, there is provided multi-spectral darkfield imaging methods and procedures that can be incorporated into a fluorescence-based cell screening system. The utility of incorporating the darkfield imaging methods and procedures is that it provides detailed multi-parametric information about the morphology, organization and distribution of cells and objects within cells that cannot be obtained using fluorescent reporters. For example, the use of toxic fluorescent DNA markers to mark the position of the nucleus for use in image processing is no longer required. The position of the cell surface and of intracellular objects can also be directly identified using multi-spectral darkfield imaging. When equipped with an imaging spectrometer, the imaging spectrometer and associated image analysis algorithms analyze both the morphology of cells using darkfield imaging and the location of fluorescent reporters detected using fluorescence imaging.

The present disclosure is directed at applying multi-spectral darkfield imaging to image cells and automated image analysis software and methods to analyze multi-spectral darkfield images. The present disclosure also uses imaging spectrometry (hyperspectral imaging) to detect new information content in darkfield images. The darkfield cell screening system and methods described here is a non-invasive system and method for use in automated cell screening. The system and methods report on cell physiology without requiring fluorescent reporters, and decreases the cost and complexity of automated cell screening platforms.

DESCRIPTION OF THE DRAWINGS

Example embodiments will now be described by way of example with reference to the accompanying drawings, through which like reference numerals are used to indicate similar features.

DETAILED DESCRIPTION

Figure 1:
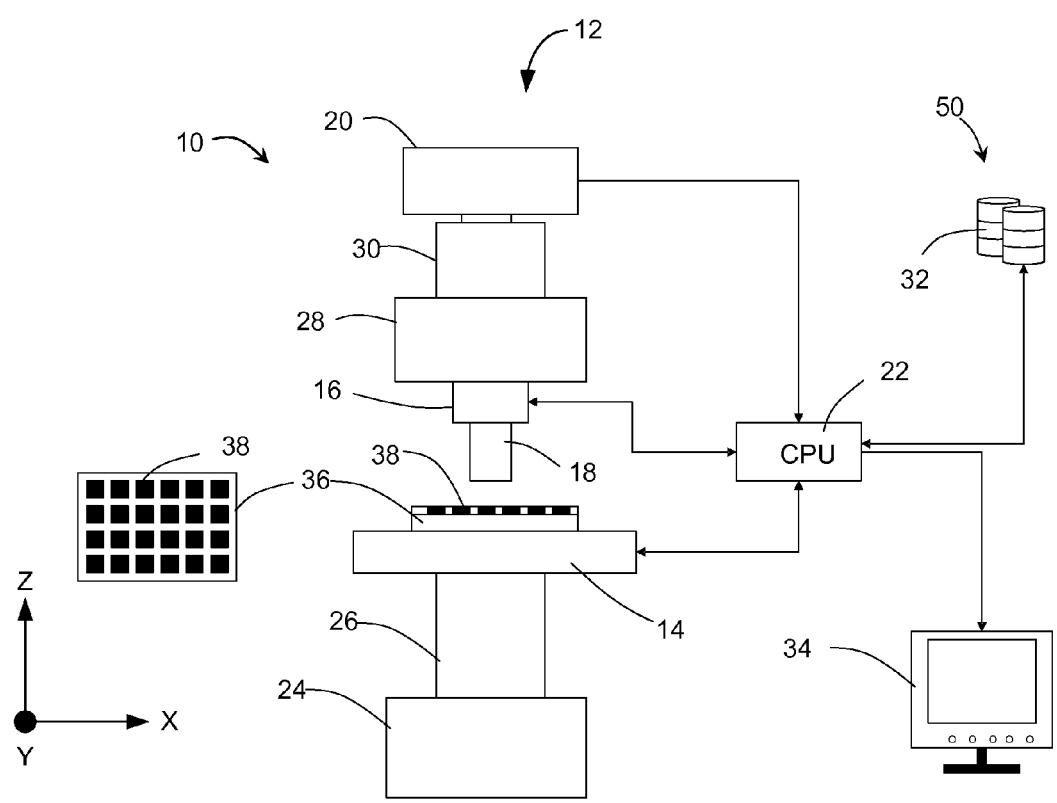
FIG. 1 is a diagram of a darkfield cell screening system in accordance with an example embodiment.

Turning to FIG. 1, a diagrammatic view of a darkfield cell screening system is shown. The system 10 includes a darkfield microscope 12 with a motorized microscope stage 14, an autofocus device 16 to which a microscope objective 18 is attached, a color charge-couple device (CCD) camera 20 and a processor, such as a central processing unit (CPU) 22. The darkfield microscope 12 is preferably an upright microscope although an inverted microscope can also be employed. The darkfield microscope 12 additionally includes a light source 24, a darkfield condenser 26, a microscope head 28 and a camera coupler 30. As will be understood, not all parts of the microscope are shown, however, components involved in the implementation of a system and method of automated screening of cells are shown. The CPU 22 has connectivity with a set of databases 32 for data storage and with a display, such as a computer monitor, 34 for data display and visualization.

Still referring to FIG. 1, an imaging chamber, or cell array chip 36 containing arrayed cells 38 is placed on the motorized stage 14 of the darkfield microscope 12 for analysis. In the current embodiment, the cell array chip 36 contains cells 38 arrayed on a substrate glass surface in isolated samples so that multiple cells can be examined at one time.

The cell array chip 36 may alternatively be a lab-on-a-chip. Lab-on-a-chip refers to chips containing a network of channels and wells generally etched onto glass, such as a glass slide, or polymer chips. Microfluidics may be used to move pico liter volumes of test solutions through the microfluidic channels of the lab-on-a-chip for delivery to cells 38 growing in the wells.

The cell array chip 36 may also be a standard multi-well plate containing cells, such as a 96-well or 356-well glass bottom multi-well plate. If a multi-well plate is used, the multi-well plate is preferably delivered to the motorized stage 14 by a robotic arm (not shown) and a liquid dispenser optionally dispenses test compounds into each well of the multi-well plate.

In one embodiment, the components and operations of the darkfield cell screening system are under the control of the CPU 22. The microscope stage 14 is motorized in order to shift the cell array chip 36 to image different locations within a cell sample or well in the X-Y or radial plane, when more than one field of view or location is specified in the system, or software, and is also used to shift the position of imaging between different samples or wells of arrayed cells 38 on the chip 36. The microscope stage 14 is generally a linear-motor driven XY translation stage. The objective 18 of the darkfield microscope 12 is driven by objective motor drive 16, generally a piezoelectric drive, in order to acquire images of the same cells at different Z-planes, or axial planes, if required. An illustration of the XYZ planes is shown in FIG. 1 for reference. Prior to imaging, the system employs motor drive 16 and a method of autofocusing, such as via software or other methods, to predetermine the plane or planes of focus at which images will be acquired. A stack of darkfield images of cells in a representative field of view is acquired under the control of the CPU 22 at different Z-planes or levels along the Z-plane and the most focused image in the Z-stack is calculated by a deconvolution algorithm such as those known in the art. Images of cells in all specified fields of view of arrayed cells 38 on the chip 36 are then acquired at this predetermined Z-plane. Alternatively, a stack of images in the Z-direction above and below this plane may be additionally acquired for use in 3D image reconstruction. Alternatively or additionally, the autofocus software may be used for every field of view when specimen height and morphology differs greatly between locations or treatment conditions.

Still referring to FIG. 1, objective motor drive 16 can be substituted by a piezoelectrically driven z-axis stage mounted on microscope stage 14 to acquire images in multiple axial planes or for use in autofocusing.

Figure 2:
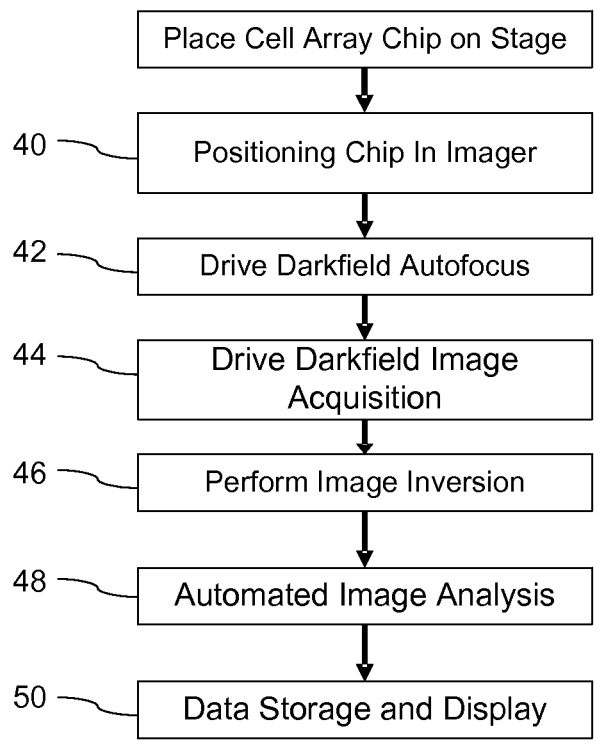
FIG. 2 is a flow chart showing the operations of the darkfield cell screening system in accordance with an example embodiment.

Reference is now made to FIG. 2, which shows a flow diagram of a method performed by the darkfield cell screening system which is preferably under the control of CPU 22. The system operating from CPU 22 contains pre-specified or pre-stored horizontal positions (X-Y) and vertical planes (Z) for acquiring images in the cell array chip 36 which has been placed on the stage 14. Motorized positioning 40 of the chip in the imager is effected by CPU 22 which drives the motorized stage 14 of the system to move the cell array chip 36 to different X-Y positions of the chip. Different X-Y positions can include one or a plurality of locations in any given sample or well location, and one or a plurality of samples or wells. In one or a plurality of locations on the chip 36 and before acquiring an image for the location, CPU 22 drives the darkfield autofocus 42 device to pre-acquire a stack of Z-plane images. The Z-stack is analyzed by the deconvolution algorithm executing on CPU 22 to determine the best focal plane for collecting images on the chip. The darkfield autofocus is typically done only at the first field of view to be imaged on the chip. Alternatively, darkfield autofocus device may be configured 42 to be performed at a plurality of locations to be imaged on the chip 36. CPU 22 drives darkfield image acquisition 44 by the color CCD camera which collects RGB images of cells at predefined locations. Color CCD cameras have either three image sensors (Red, Blue and Green) or a single sensor and a Bayer color filter that delivers three broadband color channels of red, green and blue to the single sensor. The system then performs image inversion 46 which inverts the luminance or chrominance components or both of the acquired images. Automated image analysis 48 includes segmentation, feature space and statistical analysis of images to identify and classify objects in the color images and is further described below. Data storage and display 50, including database connectivity, is based on commonly accepted data formats and includes the storage of information to the set of databases 32 and the display of the results to the user on the computer monitor 34.

Figure 3:
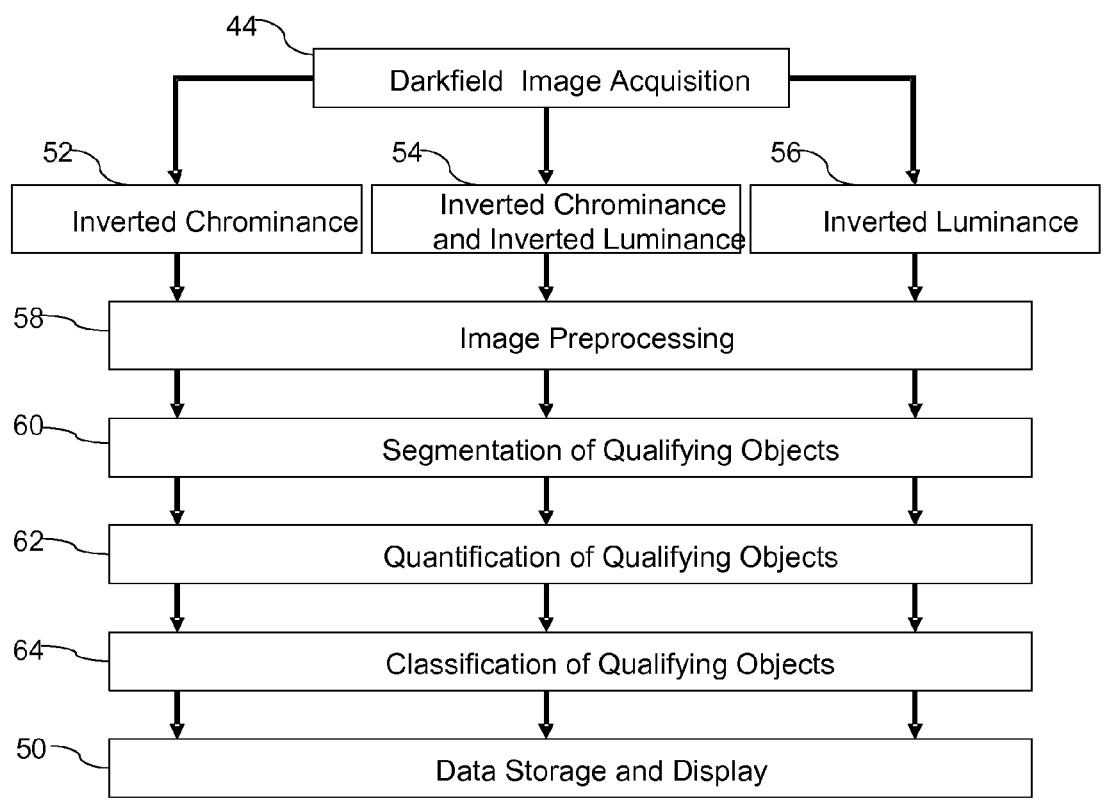
FIG. 3 is a flow chart showing image processing operations of the darkfield cell screening system in accordance with an example embodiment.

Reference is now made to FIG. 3, which shows a flow diagram detailing image processing operations of a darkfield cell screening system. The CPU which controls the operations is not shown. Image acquisition 44 is done in RGB color using a color CCD camera. The image processing system in this embodiment is modeled after the operations of the human visual system in analyzing color scenes or images and employs a luminance-chrominance color space model. The human visual system is thought to be composed of separate pathways for the processing of luminance and chrominance components of color scenes. There may also be interactions between the pathways to provide more complex information with regard to objects, shapes and patterns. Generally, texture information is derived from the luminance component whereas chrominance gives information about similarities between objects or information that discriminates between textures. The darkfield cell screening system by analogy with the human visual system analyzes chrominance and luminance components separately or in combination to provide information that cannot be obtained using gray level image processing alone. In gray level imaging methods, only intensity determines texture. The system of this disclosure combines chrominance information with luminance information to determine different textures over a wider range of parameters.

A variety of color spaces may be employed in color image processing. Changing the color space used by the color image processing system in the present disclosure improves segmentation and classification of color objects. The most common is Red Green Blue (RGB) which is generally device-dependent. RGB is an additive color model in which red, green and blue are added up to make the final color spectrum according to the following equation, where the sum is white light:

$$R(x)+G(y)+B(z)=1$$

Since RGB gives equal weight to each color, RGB does not mimic human color vision, which is more sensitive to green than to red or blue. Alternative color space models are also contemplated. The color of different objects may be distinguished by brightness, hue and saturation (HIS or IHS). The combination of hue and saturation gives chrominance, with the result that the color of an object can be reduced to two terms: (1) Luminance (brightness or intensity) and (2) Chrominance (hue and saturation components). Another example of a color space is the YUV encoding, where Luminance (Y) and Chrominance (UV) is derived from RGB according to the following equations:

$$Y=0.299R+0.587G+0.114B$$

$$U=0.596R-0.275G-0.321B$$

$$V=0.212R-0.523G+0.311B$$

In YUV, two signals (U and V) describe the color which, when recombined with Luminance (Y) gives the original color image. Luminance-chrominance color spaces more closely mimic human vision than RGB because they use weighed averages of the three primary colors at each pixel (green 59%, red 30%, blue 11%). Luminance histograms also keep track of the color of each pixel while RGB generally discards this information. In addition to RGB and YUV, various other color spaces and metrics are available that may also be used, including ones for which standards are being defined, such as CIE (Commission Internationale de l'Eclairage) Linear RGB/Gamma RGB and other Luminance-Chrominance color spaces. The software automatically analyzes image content using alternative color space models, resulting in improved segmentation and classification of objects.

Still referring to FIG. 3, the darkfield cell screening system in this embodiment employs luminance-chrominance color space and inverts the chrominance 52, inverts the luminance 56, or inverts both chrominance and luminance 54 in acquired images to provide up to three data sources from the original RGB color image. The process of image acquisition and image inversion in this embodiment is performed because inverted luminance-chrominance darkfield images, with objects appearing as dark objects on a bright background, model human vision and are more easily interpreted by humans. Inverting the chrominance 52 or the luminance 56 does not alter the information content of the original luminance-chrominance image.

An aspect of the present disclosure is that the system, in an automated manner, performs image processing and analyses of the content of the inverted images in order to classify objects. Known techniques of image segmentation, feature space analysis and statistical analysis may also be used.

Still referring to FIG. 3, the image processing 58 of the inverted images includes operations such as de-noising, image enhancement or texture transformation. Segmentation of qualifying objects 60 is performed using different combinations of color information with thresholding, Sobel edge detection, watershed separation of objects, and morphological operations such as top-hat transformation or filtering of objects according to size, shape or color. Quantification of segmented or qualified objects 62 produces multiple measures for objects in the image. Morphological measures include, but are not limited to, object count, size, form factor, elongation, radius, area, color, intensity, luminance, coordinates, number of neighbours, inter-object distances, distance from cell nucleus or cell surface, or other measures. Quantification of segmented objects 62 and the use of appropriate feature vectors then allows for classification of qualifying objects 64, including cells and intracellular or extracellular objects. Classification of objects 64 can additionally or alternatively employ cluster analysis or can additionally or alternatively employ supervised or unsupervised learning algorithm methods. Data storage and display 50 of the information can then be performed based on commonly accepted data formats.

Figure 4:
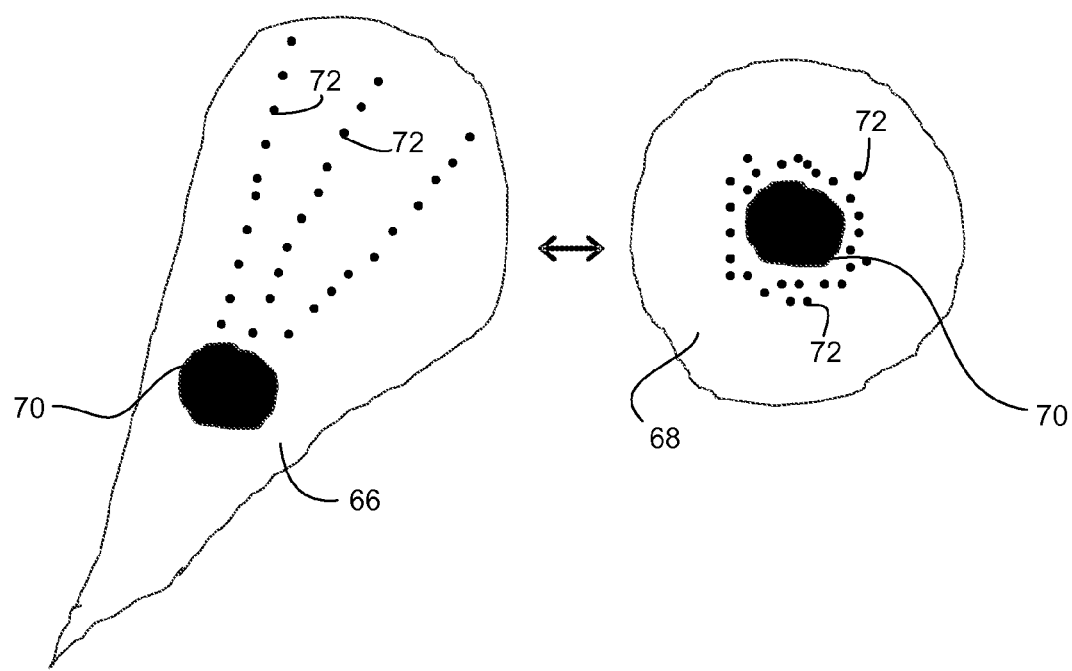
FIG. 4 is a drawing of two morphological states of a cell as examples of cell structures and shapes that the image processing operations of the darkfield screening system analyze and distinguish.

Reference is now made to FIG. 4, which shows a drawing of two morphological states of a cell as examples of cell structures and shapes that the image processing operations would analyze and classify. The morphological states of a cell generally inter-convert depending on environmental conditions or chemical stimuli. Intracellular objects within the two cells 66 and 68 in FIG. 4 include the nucleus 70 and numerous small granules 72. Both cells are attached to a substrate, generally glass, and are not free-floating. In the well spread out cell 66 on the left, granules 72 within the cell are oriented in linear arrays. The cell 68 on the right, in contrast, has rounded up and has a circular shape, and in this cell 68 the granules 72 are located centrally and surround the nucleus 70 in a ring. As the cell screening system acquires and analyzes color images, images of cells would have color information that is used in segmentation and classification of objects such as the overall size, shape, orientation and proximity of cells and of objects within cells such the nucleus and granules.

Figure 5:
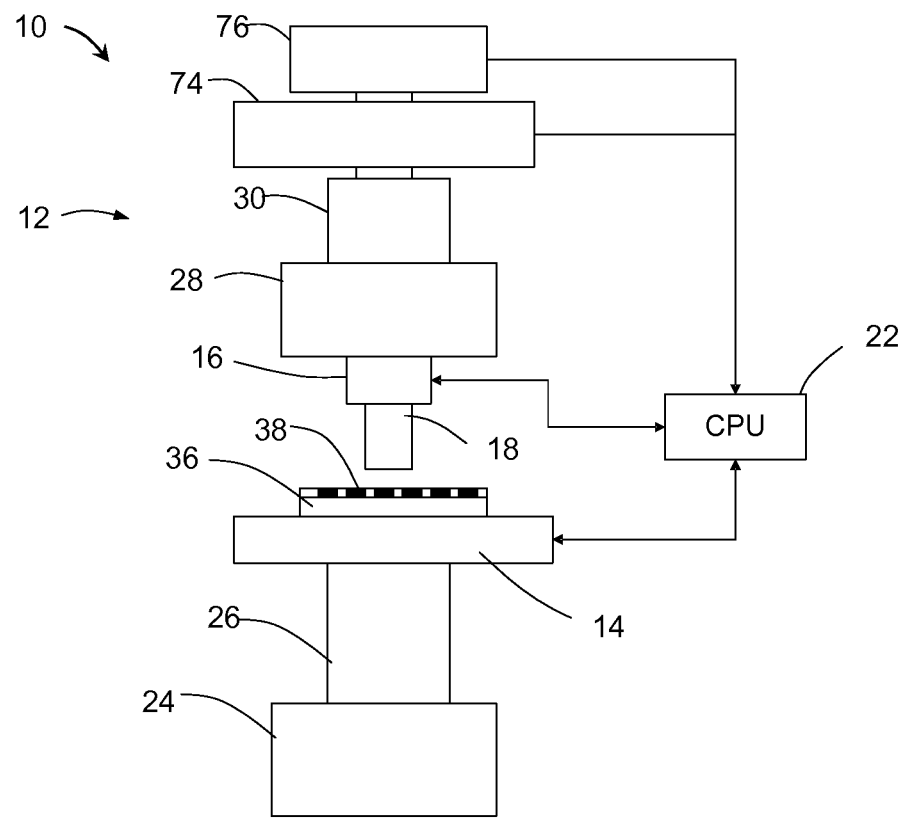
FIG. 5 is a diagrammatic view of the darkfield cell screening system equipped with an image spectrometer in accordance with an example embodiment.

Reference is now made to FIG. 5, which shows a diagrammatic view of the darkfield cell screening system equipped with an image spectrometer 74 in accordance with another embodiment. The imaging spectrometer 74 is located at the intermediate image plane of upright microscope 12, which is the main modification of the embodiment described in FIG. 1. Image spectrometry can be performed using several sources of photons. When used with darkfield imaging condenser 26, scattered photons are collected by objective 18, propagate back through the optical path, and are focused onto a slit or pinhole which serves as the entrance aperture of the imaging spectrometer 74. Light is dispersed by the spectrometer, generally by means of a prism, and detected by a backside CCD camera 76, generally a monochrome CCD camera. Additional imaging modalities for hyperspectral imaging are possible on the same microscope, such as brightfield, UV and fluorescence imaging, when microscopes are suitably equipped (not shown).

Figure 6:
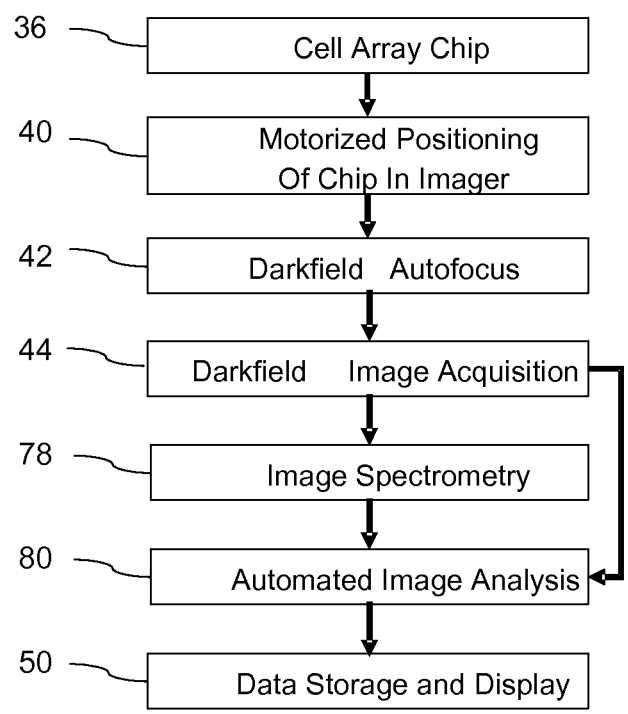
FIG. 6 is a flow chart showing automated procedures in cell screening employing darkfield imaging and an imaging spectrometer in accordance with an example embodiment.

Reference is now made to FIG. 6 which shows a flow diagram of a method of darkfield imaging using the darkfield cell screening system described in FIG. 5 when the system is equipped for hyperspectral imaging. For darkfield imaging, the operations used in the embodiment are described in FIGS. 1 and 2. Alternatively or in combination with conventional darkfield image acquisition 44, image spectrometry 78 is performed at the same image plane or planes determined by darkfield autofocus 42. Automated image analysis 80 here combines the feature vector and statistical analyses and classification of objects in the darkfield images, as outlined in the embodiment described in FIG. 3, with the spectral signatures or features of objects obtained using image spectrometry to provide a higher parameter classification of cells and objects in the field of view. Alternatively, automated image analysis 80 may use only image spectrometry 78 data to output cell and object classifications. After the image spectrometry 78, an image analysis 80 is performed and then data stored and displayed.

In some example embodiments, there is generally provided automated components and methods to perform cell screening using darkfield microscopy.

In some example embodiments, there is generally provided automated components and methods to perform cell screening using both darkfield microscopy and hyperspectral imaging.

In some example embodiments, there is generally provided a system that automatically analyzes multi-spectral darkfield images using one or more color space models.

In one example embodiment, there is generally provided a darkfield cell screening system generally comprised of a darkfield microscope, a motorized microscope stage, an autofocus device, a color CCD camera and a CPU. There is also provided a system that controls components and processing functions of the darkfield cell screening system, generally including control of the horizontal (X-Y or radial) and vertical (Z or axial) positions of imaging, image acquisition by the camera, image processing, data storage and data visualization/presentation.

In another example embodiment, there is provided an automated image processing system in luminance-chrominance color space of the darkfield cell screening system that generally inverts the chrominance and luminance components of darkfield images acquired using the color CCD camera, analyzes the chrominance or luminance content of images, and determines the objects present in the image, the shape and location of cells, the shape and location of structures or particles within cells, and the shape and location of any anomalous objects.

In another example embodiment, there is provided an automated darkfield cell screening system with an imaging spectrometer coupled to the microscope and automated image processing means that analyzes the spectral content of images. The image processing means uses pixel by pixel spectral information to analyze the morphology, position and classification of cells and objects. When the system is also equipped for fluorescence microscopy, the image spectrometer and image processing means also analyzes the distribution of fluorescent reporters within cells.

In the preceding description, for purposes of explanation, numerous details are set forth in order to provide a thorough understanding of the embodiments of the disclosure. However, it will be apparent to one skilled in the art that these specific details are not required in order to practice the disclosure.

The above-described embodiments of the disclosure are intended to be examples only. Alterations, modifications and variations can be effected to the particular embodiments by those of skill in the art without departing from the scope of the disclosure, which is defined solely by the claims appended hereto.

The invention claimed is:

1. A system for a darkfield imaging system for automating screening of at least one cell comprising:

a darkfield microscope comprising a motorized microscope stage for receiving the at least one cell;

image acquiring apparatus configured to acquire one or more darkfield images, via transmitted or reflected darkfield illumination, of the at least one cell in color at one or more specified wavelengths or wavelength bands, the image acquiring apparatus for acquiring located at an end of the microscope, away from the stage, the image acquiring apparatus comprising one or more of an image spectrometer, an image spectrograph, and a CCD camera;

an autofocus device; and a processor for controlling the system, the processor in communication with the microscope, the microscope stage, the image acquiring apparatus and the autofocus device.

2. The system of claim 1 further comprising:

a test substance delivery system configured to deliver test substances at one or more specified locations to said at least one cell.

3. The system of claim 2 wherein the test substance delivery system can dispense different test substances at different locations.

4. The system of claim 1 wherein the at least one cell is located within an imaging chamber.

5. The system of claim 4 wherein the imaging chamber is a glass slide, a multi-well plate, a tissue microarray, a chip or a microfluidic device.

6. A method of darkfield imaging for automated screening of at least one cell comprising:

acquiring one or more darkfield images, via transmitted or reflected darkfield illumination, of said at least one cell in color at one or more specified wavelengths or wavelength bands, the acquiring performed using an image acquiring apparatus comprising one or more of an image spectrometer, an image spectrograph, and a CCD camera; and, processing, using a processor, pixel data in said at least one image using one or more color space models to obtain measurements relating to said at least one cell.

7. The method of claim 6 further comprising:

processing, using said processor, said pixel data using a luminance-chrominance color space model to obtain measurements relating to said at least one cell.

8. The method of claim 7 wherein one or more additional color space models are used in processing said pixel data in combination with the luminance-chrominance color space model.

9. The method of claim 7 wherein processing the pixel data comprises:

inverting the images in the luminance-chrominance color space to obtain an inverted luminance image, an inverted chrominance image and a combined inverted chrominance and luminance image, wherein one or more of the inverted images is automatically analyzed by image analysis algorithms or operations.

10. The method of claim 6 further comprising:

acquiring color digital darkfield images of entities located outside the lat least one cell or that have entered or invaded the at least one cell; and processing pixel data in the darkfield images using one or more color space models to obtain measurements relating to the entities.

11. The method of claim 10 wherein said entities inside or outside the at least one cell are selected from the group consisting of viruses, prokaryotes, foreign molecules and natural endogenous components of said at least one cell.

12. The method of claim 10 wherein said measurements provide further information about effects of test substances on, or time-dependent changes in, said entities.

13. The method of claim 6 wherein the at least one cell is selected from the group consisting of living cells, dead cells, prokaryotic cells, eukaryotic cells, immortal cells, primary cells, and cells in a tissue.

14. The method of claim 6 wherein processing of said pixel data comprises weighting the information obtained from said measurements in order of statistical importance.

15. The method of claim 6 wherein said measurements provide information about the effects of test substances or time-dependent changes in, one or more of the following states of cells: cell viability, spreading, differentiation, transformation, aging, necrosis, apoptosis, morphological shape, relationships of cells with each other in a population of cells, infection or invasion of cells by exogenous agents, receptor activation or the toxic effects of test substances on said cells.

16. The method of claim 6 wherein said acquiring comprises:

colleting said one or more darkfield images at different focal planes to obtain a 3D image of said at least one cell.

17. The method of claim 6 wherein said acquiring comprises:

repeatedly imaging the at least one cell to analyze time-dependent changes in said measurements.

* * * * *